J. E. GRAYBILL.
CONNECTION BOX FOR ELECTRIC CONDUITS.
APPLICATION FILED MAY 15, 1907.
954,954.
Patented Apr. 12, 1910.
2 SHEETS—SHEET 1.
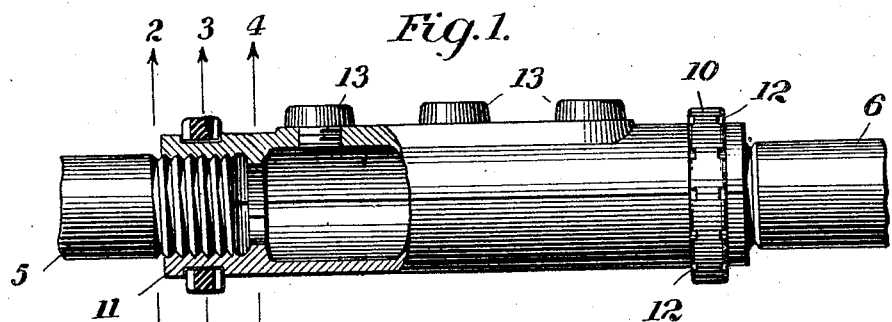
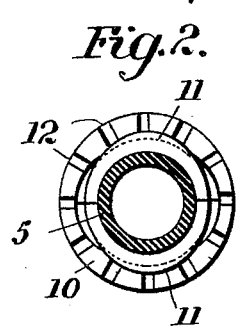
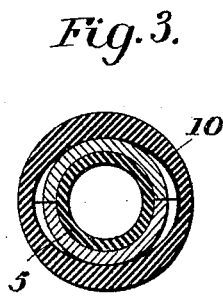
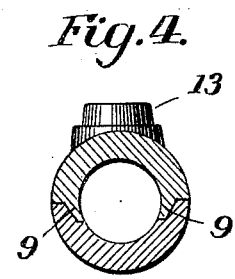
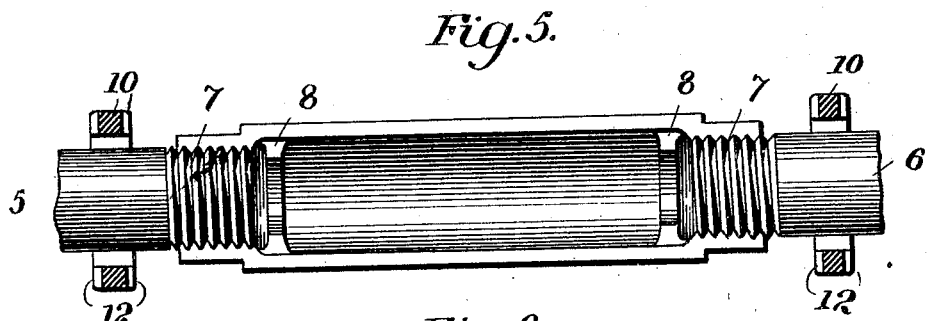
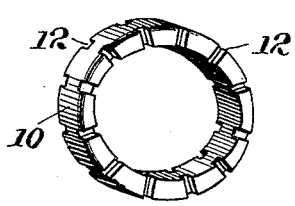
Witnesses
Inventor
John E. Graybill
Attorneys J. E. GRAYBILL.
CONNECTION BOX FOR ELECTRIC CONDUITS.
APPLICATION FILED MAY 15, 1907.

954,954.

Patented Apr. 12, 1910.
2 SHEETS—SHEET 2.

Witnesses

Inventor
John E. Graybill

Attorneys

UNITED STATES PATENT OFFICE.

JOHN E. GRAYBILL, OF YORK, PENNSYLVANIA.

CONNECTION-BOX FOR ELECTRIC CONDUITS.

954,954.  Specification of Letters Patent.  Patented Apr. 12, 1910.

Application filed May 15, 1907. Serial No. 373,771.

*To all whom it may concern:*

Be it known that I, JOHN E. GRAYBILL, a citizen of the United States, and resident of York, York county, State of Pennsylvania, have invented certain new and useful Improvements in Connection-Boxes for Electric Conduits, of which the following is a specification.

The present invention relates to improvements in connection or junction boxes for electric wire conduits and has for its object to provide a simple connection which may be readily detached from the conduit sections connected thereby without requiring any adjustment or manipulation of the latter.

Figure 7:
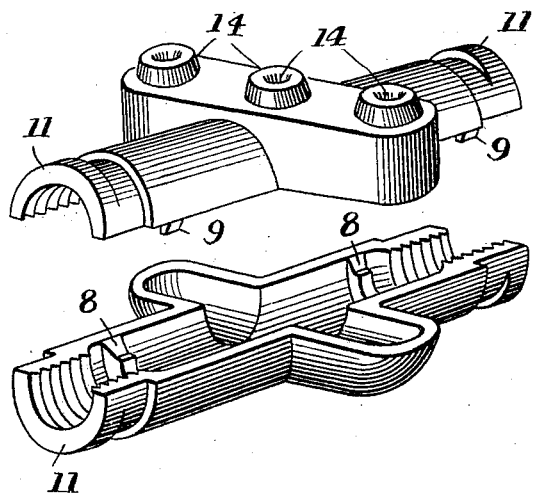
Figure 8:
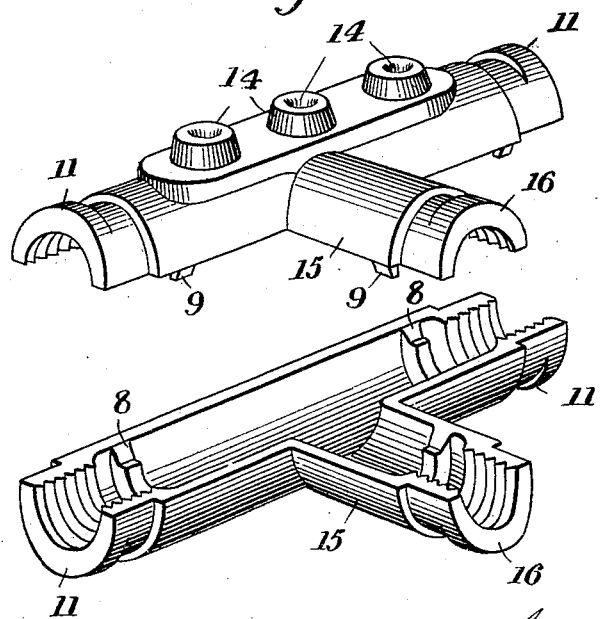

In the accompanying drawings, Figure 1 is an elevation, partly broken away, of two sections of an electric wire conduit connected by a junction box constructed in accordance with the present invention; Figs. 2, 3 and 4 are transverse sectional views on the lines 2—2, 3—3 and 4—4 of Fig. 1, respectively; Fig. 5 is a view showing the locking means detached from the junction box and one section of the latter removed; Fig. 6 is a detail view of one of the locking rings; Figs. 7 and 8 are perspective views illustrating junction boxes constructed in accordance with the present invention and of different forms from that shown in Figs. 1 to 5.

Referring to the drawings, 5, 6, designate two sections of an electric wire conduit, which may be of any suitable material, diameter, length, etc.

It is customary to make such conduit sections in various lengths and to connect them at any desired intervals by junction boxes provided with outlets for branch wires or conduits. Various forms of such boxes have heretofore been proposed but practical experience has shown that each is objectionable for some reason. It has been customary to provide the box with a removable cover and to connect such cover with the body of the box by screws. This requires the use of special tools for securing the cover in place and the screws or other fastening means being independent of the box are liable to be lost. Such boxes have also been connected with the conduits in various ways and in some instances it has been necessary, in order to remove a box from a line of conduits, to take down the entire line or at least the conduit sections directly connected with the box.

Such objections as experience has shown to exist with the boxes as heretofore constructed, are avoided by the present invention according to which the body of the box is divided longitudinally into two similar sections, each having at one end a female thread adapted to coöperate with a reduced threaded section 7 on the end of a conduit section. Each section of the box is provided with a pair of internal ribs 8 which serve as abutments or stops to limit the inward movement of the conduit sections and preferably one of the sections of the box is provided with a plurality of tapered lugs 9 adapted to fit in correspondingly shaped seats in the other section when the two sections of the box are brought together. By this arrangement the sections of the box are always properly related and held against relative lateral movement.

The sections of the box, as shown, are held together by clamping or locking rings 10. Preferably each section of the box is provided at its ends with radially projecting lugs 11 and the rings 10 are of such cross sectional area that they may be slipped on the box over said lugs. When the rings are thus placed in position it will be seen that they are arranged eccentrically to the box and by turning said rings both sections of the box will be forced against and held securely in position on the conduits 5, 6. To facilitate turning the rings in the manner described, they are preferably provided on both edges with a plurality of marginal notches 12 adapted to be engaged by a suitable spanner or other tool.

One of the sections of the box is provided with any suitable number of outlets 13, shown in the drawing as having threaded stems screwed into suitably threaded openings in the walls of the box section.

The box may be made in any suitable form. As shown in Figs. 1 to 5, the box is of the same general form as the conduits and the outlets 13 are arranged longitudinally thereof.

In Fig. 7, the outlets 14 are arranged in a line transverse to the length of the box or the conduits connected thereby, which latter however extend in line with each other. If the box is to connect two sections of a conduit with another conduit extending substantially at right angles thereto, the form shown in Fig. 8 is employed in which each box section is provided with a side extension 15 having its outer end internally threaded and provided with a radial lug 16 similar to the lug 11 of the construction hereinbefore described.

The manner of using and the advantages incident to such a construction of junction box as is herein illustrated and described, will be readily understood and appreciated.

As shown in Fig. 5 when it is desired to open a box constructed in accordance with this invention it is merely necessary to rotate the clamping rings 10 until they are in a position to release the sections of the box and to pass over the lugs 11 thereon. Said rings may then be slipped longitudinally on to the adjacent conduits and both box sections will then be free from the conduits and may be easily removed. The clamping or locking rings are therefore always supported either by the boxes or the conduits and may be readily slipped and turned into position to lock the sections of the box together and to the conduits.

It will be evident that the invention is not limited to conduits of any particular type but that a box constructed in accordance with the present invention could be clamped upon the ends of conduit sections whether or not they were threaded as shown in the particular embodiments of the invention selected for the purpose of illustration.

Having thus described the invention what is claimed and desired to be secured by Letters-Patent is,

1. The herein described junction box for electric wire conduits comprising a plurality of separable longitudinal sections, one of the sections having a lateral outlet formed therein, and a locking means, the said locking means and box being provided with interengaging relatively inclined surfaces whereby a partial rotation of the locking means will clamp the sections together.

2. The herein described junction box for electric wire conduits comprising a plurality of separable longitudinal sections, and quick release ring-like clamping means, the said clamping means and box having interengaging surfaces oppositely inclined at such an angle that a partial rotation of the clamping means will clamp the sections together.

3. The herein described junction box for electric wire conduits comprising a plurality of separable longitudinal sections, and quick release ring-like clamping means having such an opening therethrough as adapts it to pass freely over the end of the box, the said clamping means and box having interengaging surfaces oppositely inclined at such an angle that a partial rotation of the clamping means will secure the sections together.

4. The combination with two separated sections of an electric wire conduit, of a junction box for connecting said conduit sections and comprising a plurality of longitudinally extending separable sections, one of said sections having a lateral outlet formed therein, and a locking ring adapted to surround the conduit section and the box the said ring and box having eccentrically arranged surfaces whereby the ring when rotated on the box will secure the sections thereof together.

5. The combination with two separated sections of an electric wire conduit, of a junction box for connecting said conduit sections and comprising a plurality of longitudinally extending separable sections, one of said sections having a lateral outlet formed therein, means for engaging the sections of the box with the conduit sections, and clamping means adapted to surround the conduit sections on the box the said clamping means and box having interengaging surfaces oppositely inclined at such an angle that a partial rotation of the clamping means will clamp the sections together.

6. The combination with two separated sections of an electric wire conduit, of a junction box for connecting said conduit sections and comprising a plurality of longitudinally extending separable sections, the end portions of said sections forming a part having an exterior elliptical in cross section, and a ring having an elliptical interior passing freely over said part and adapted by a turn thereon to clamp the sections together.

7. The herein described junction box for electric wire circuits comprising a plurality of separable longitudinal sections and quick release clamping means adapted to pass freely over said sections so as to embrace the same in clamping position, the said means and sections being provided with interengaging surfaces having such relative inclination that a partial rotation of the clamping means will clamp the sections together.

8. A clamping means for a divided electric conduit box comprising a tubular portion of said box divided longitudinally and having an exterior elliptical in cross section, and an elliptical ring adapted to freely pass over said tubular portion and to clamp the parts together by turning thereon.

9. A clamping means for a divided electric conduit box comprising a tubular portion of said box divided longitudinally and having an exterior elliptical in cross section the said divided portions being provided with lugs or flanges forming a groove, and an elliptical ring adapted to pass over said lugs and to fit in said groove and to clamp the parts together by turning therein.

In testimony whereof I affix my signature in presence of two witnesses.

JOHN E. GRAYBILL.

Witnesses:
 EDWARD J. LOUCKS,
 H. G. WIEST.